United States Patent [19]

Pechmeze et al.

[11] 4,287,121
[45] Sep. 1, 1981

[54] WATER-SOLUBLE POLYFLUORO ACID AZO DYESTUFFS

[75] Inventors: Jacques P. E. Pechmeze, Paris; Robert F. M. Sureau, Enghien Les Bains, both of France

[73] Assignee: Produits Chimiques Ugine Kuhlmann, Courbevoie, France

[21] Appl. No.: 711,187

[22] Filed: Aug. 3, 1976

Related U.S. Application Data

[63] Continuation-in-part of Ser. No. 428,970, Dec. 27, 1973, abandoned.

[51] Int. Cl.³ .............. C09B 29/085; C09B 29/26; C09B 31/043; C09B 31/08; D06B 3/24
[52] U.S. Cl. .............. 260/186; 260/174; 260/178; 260/184; 260/187; 260/190; 260/191; 260/205; 260/206; 260/207; 260/207.1; 260/196
[58] Field of Search .............. 207/174, 178, 184, 186, 207/191, 190; 260/187

[56] References Cited

U.S. PATENT DOCUMENTS

| 2,391,179 | 12/1945 | McNally et al. | 260/187 |
|---|---|---|---|
| 2,516,302 | 7/1950 | Dickey | 260/207.5 |
| 2,516,303 | 7/1950 | Dickey | 260/207.5 |
| 2,700,686 | 1/1955 | Dickey et al. | 260/196 X |

OTHER PUBLICATIONS

Venkataraman, "Synthetic Dyes", vol. I, pp. 457-463 (1952).

*Primary Examiner*—Floyd D. Higel
*Attorney, Agent, or Firm*—Beveridge, DeGrandi, Kline & Lunsford

[57] ABSTRACT

A compound having the formula:

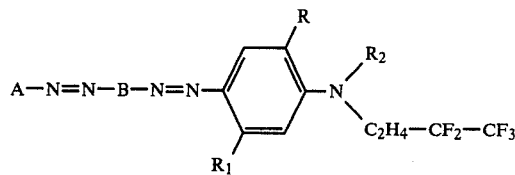

wherein
 X represents a —$SO_3H$ or $PO_3H_2$
 Y represents hydrogen, chlorine, alkyl, alkoxy or nitro,
 Z represents hydrogen,
 B represents a p-phenylene or 1,4-naphthylene unsubstituted or substituted by one or two alkyl or alkoxy groups,
 R represents hydrogen, alkyl or alkoxy,
 $R_1$ represents hydrogen, chlorine, alkyl, alkoxy or acetylamino,
 $R_2$ represents hydrogen, alkyl, cyanethyl or hydroxyalkyl, the alkyl and alkoxy having 1 to 5 carbon atoms,

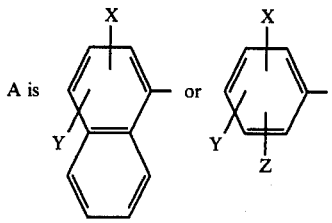

4 Claims, No Drawings

WATER-SOLUBLE POLYFLUORO ACID AZO DYESTUFFS

This application is a continuation-in-part application of application Ser. No. 428,970 filed on Dec. 27, 1973, and now abandoned.

The present invention relates to new water-soluble polyfluoro acid azo dyestuffs which are suitable for the colouration of natural or synthetic fibres based on polyamides.

According to the present invention azo dyestuffs are provided of the general formula:

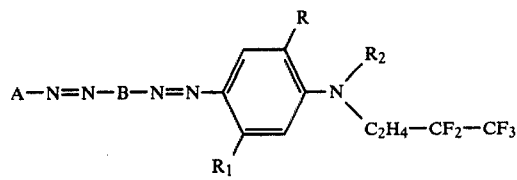

wherein

X represents a —SO$_3$H or PO$_3$H$_2$

Y represents hydrogen, chlorine, alkyl, alkoxy or nitro,

Z represents hydrogen with the benzene nucleus,

B represents a p-phenylene or 1,4-naphthylene unsubstituted or substituted by one or two alkyl or alkoxy groups, R represents hydrogen, alkyl or alkoxy, R$_1$ represents hydrogen, chlorine, alkyl, alkoxy or acetylamino, R$_2$ represents hydrogen, alkyl, cyanethyl or hydroxyalkyl, the alkyl and alkoxy having 1 to 5 carbon atoms, and A is

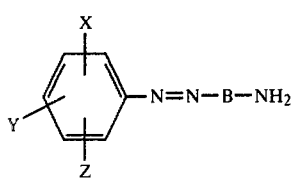

Compared with their non-fluorinated homologues, the new dyestuffs are characterised by a displacement of their maximum absorption towards the shortest wavelengths and by an improved fastness to light.

The new dyestuffs may be prepared for example by coupling the diazo derivative of an amine of the general formula:

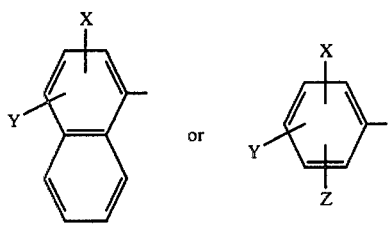
(II)

with a coupling compound of the general formula:

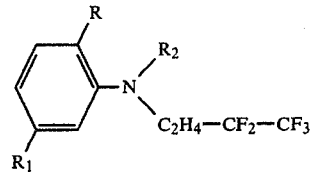
(III)

wherein X, Y, Z, R, R$_1$ and R$_2$ have the same significance as above.

Such coupling compounds have been described in our pending application Ser. No. 414,592 filed on Nov. 9, 1973, and now abandoned, for "Polyfluoroalkylarylamines and their processes of preparation".

The dyestuffs according to the invention are suitable for the colouration of natural or synthetic fibres based on polyamides, and have good fastness properties, in particular fastness to light and to washing. The dyeing may be effected under the same conditions as with the conventional acid dyestuffs.

The invention is illustrated by the following Examples in which the parts are parts by weight unless the contrary is indicated.

EXAMPLE 1

17.3 parts of 3-amino-benzenesulphonic acid are dissolved in 200 parts by volume of distilled water by means of 5.3 parts of sodium carbonate. 7 parts of sodium nitrite are then added. This solution is run slowly into 120 parts by volume of an aqueous solution of about 6 N hydrochloric acid, previously cooled to 0°–5° C. The mixture is stirred for an hour, while maintaining the temperature at 0°–5° C. The excess of sodium nitrite is destroyed by addition of sulphamic acid.

The solution of the diazonium chloride is slowly added, with stirring, to the mixture comprising 23.9 parts of N-ethyl-N-3,3,4,4,4-pentafluoro-butylaniline, 25 parts of sodium acetate in 400 parts of glacial acetic acid.

After remaining overnight, the crystalline dyestuff is filtered off and dried. 30.4 parts, i.e. a yield of 64%, of the dyestuff consisting of sodium 4'-(N-ethyl-N-3,3,4,4,4-pentafluorobutyl)-amino-1-phenylazo-benzene-3-sulphonate are obtained.

This dyestuff dyes synthetic polyamide fibres in a yellow shade of remarkable fastness to light.

Under the same conditions, the dyestuff containing the n-butyl radical instead of the pentafluorobutyl radical dyes synthetic polyamide fibres in a yellow shade with less fastness to light.

A number of Examples of monoazo dyestuffs containing the 3,3,4,4,4-pentafluoro-butyl radical and prepared by the process of Example 1 are set out in Table I.

In this Table m signifies meta, o signifies ortho and p signifies para and the positions are with reference to the azo group. In all the compounds of Table I R=H.

TABLE I

| Example | X | Y | Z | R$_1$ | R$_2$ | Shades on polyamide fibres |
|---|---|---|---|---|---|---|
| 2 | m-PO$_3$H$_2$ | H | H | H | H | Yellow |
| 3 | m-SO$_3$H | H | H | H | H | " |
| 4 | m-PO$_3$H$_2$ | H | H | H | C$_2$H$_5$ | " |
| 5 | m-PO$_3$H$_2$ | o-OCH$_3$ | H | CH$_3$ | C$_2$H$_5$ | " |
| 6 | m-SO$_3$H | p-Cl | H | CH$_3$ | C$_2$H$_5$ | " |
| 7 | p-SO$_3$H | o-Cl | H | CH$_3$ | C$_2$H$_5$ | Red Yellow |
| 8 | m-PO$_3$H$_2$ | o-Cl | H | H | C$_2$H$_5$ | Yellow |

EXAMPLE 9

4'-(N-ethyl-N-3,3,4,4,4-pentafluoro-butyl)-amino-2'-methyl-1-phenylazo-4-sulpho-naphthalene, prepared by the process of Example 1, dyes polyamide fibres in an orange shade.

EXAMPLE 10

27.7 parts of 4'-amino-azobenzene-3-sulphonic acid are dissolved in 580 parts by volume of distilled water and 55 parts by volume of about 18% hydrochloric acid. 7.2 parts of sodium nitrite in solution in 20 parts by volume of distilled water are added while maintaining the temperature at between 0° C. and 5° C. Stirring is carried out for five hours at the same temperature.

The solution of the diazonium chloride obtained is run into a solution of 28.1 parts of N-ethyl-N-3,3,4,4,4-pentafluoro-butyl-m-toluidine in 400 parts by volume of glacial acetic acid while the solution is buffered by the addition of sodium acetate.

When the coupling is finished, the dyestuff is precipitated by the addition of sodium chloride, filtered off, washed with a saturated solution of sodium chloride and dried.

60.4 parts of a mixture comprising 80% of the dyestuff consisting of the sodium salt of [4-(N-ethyl-N-3',3',4',4',4'-pentafluoro-butyl)-amino-2-methyl-benzene]-<1 azo 4'>-[benzene-azo-benzene-3-sulphonic] acid and 20% of sodium chloride were obtained. The actual yield was 81% of the theoretical yield. This dyestuff dyes fibres based on synthetic polyamides in a red shade with very good fastness to light.

The homologous dyestuff, carrying the n-butyl radical instead of the pentafluorobutyl radical, dyes fibres of synthetic polyamides in a bordeaux shade, moderately fast to light.

EXAMPLE 11

The operation was as in Example 10, but the N-ethyl-N-3,3,4,4,4-pentafluoro-butyl-m-toluidine was replaced for the coupling by 30.6 parts of N-cyanethyl-N-3,3,4,4,4-pentafluoro-butyl-m-toluidine. The dyestuff consisting of the sodium salt of [4-(N-cyanethyl-N-3',3',4',4',4'-pentafluorobutyl)amino-2-methyl-benzene]-<1 azo 4'>-[benzene-azo-benzene-3-sulphonic] acid is obtained; with a yield equal to 60% of the theoretical yield, and dyes synthetic fibres based on polyamides in a scarlet shade, the fastness to light of which is very good.

The homologous dyestuff in which the pentafluorobutyl radical is replaced by the n-butyl radical dyes synthetic polyamide fibres in a red shade with moderate fastness to light.

EXAMPLE 12

17.3 parts of 3-amino-benzenesulphonic acid are dissolved in 20 parts by volume of distilled water and 10 parts by volume of a 30% solution of sodium hydroxide. After solution is complete, it is made up to a total volume of 100 parts by the addition of distilled water, and 6.9 parts sodium nitrite in 10 parts by volume of distilled water are added.

The resulting solution is run into a mixture of 74 parts of crushed ice and 50 parts of about 18% hydrochloric acid in a period of 30 minutes, while maintaining the temperature at between 0° C. and 5° C. After 30 minutes stirring, the excess of nitrous acid is destroyed by the addition of sulphamic acid.

On the other hand, 14.1 parts of α-naphthylamine are dissolved in 110 parts by volume of distilled water and 20 parts by volume of about 18% hydrochloric acid by heating at the boil. The solution is allowed to cool to 70° C. and the temperature is reduced to 60° C. by the addition of distilled water.

75 parts of ice are added to the solution of the diazo derivative of metanilic acid. The solution of α-naphthylamine is run in rapidly and the mixture is stirred for three hours. When the coupling is complete, the first dyestuff is dissolved by the addition of 24 parts by volume of a 30% solution of sodium hydroxide. 16.5 parts by volume of a 50% solution of sodium nitrite are added, then 60 parts by volume of 18% hydrochloric acid are run in rapidly. The diazonium chloride is filtered off, then made into a paste in 80 parts by volume of distilled water and 30 parts of crushed ice. The volume is made up to 250 parts with distilled water.

The suspension of the diazonium salt is run into a solution of 28.1 parts of N-ethyl-N-3,3,4,4,4-pentafluoro-butyl-m-toluidine in 400 parts by volume of glacial acetic acid. During the addition the pH is maintained at 4 to 4.5 by the addition of sodium acetate.

When the coupling is finished, the dyestuff is salted out by the addition of 58.5 parts of sodium chloride, filtered off, washed with a 24% solution of sodium chloride and dried.

The dyestuff consisting of the sodium salt of [4-(N-ethyl-N-3',3',4',4',4'-pentafluorobutyl)amino-2-methyl-benzene]-<1-azo-4'>-[naphthalene-azo-benzene-3-sulphonic] acid is obtained with a yield equal to 89% of the theoretical yield, and it dyes synthetic fibres based on polyamides in a reddish brown shade which is fast to light.

The homologous dyestuff, in which the 3,3,4,4,4-pentafluoro-butyl residue is replaced by the n-butyl radical, dyes synthetic polyamide fibres in a brown shade with poor fastness to light.

The following Table gives the results of Xenotest tests for fastness to light on nylon of the compounds of Examples 1, 4, 5, 6, 7, 9, 10, 11 and 12 as compared with the corresponding non-fluorinated compounds.

| Compound of Example | Fastness to light on nylon | |
|---|---|---|
| | Pentafluoro compound | Corresponding non-fluorinated compound |
| 1 | 7 | 6 |
| 4 | 7 | 5 |
| 5 | 6/7 | 5/6 |
| 6 | 6/7 | ¾ |
| 7 | 5/6 to 6 | 5 |
| 9 | 5/6 to 5 | ¾ to 3 |
| 10 | 6 | 4 |
| 11 | 6 | 4 |
| 12 | 5/6 | 3 |

We claim:
1. A compound having the formula:

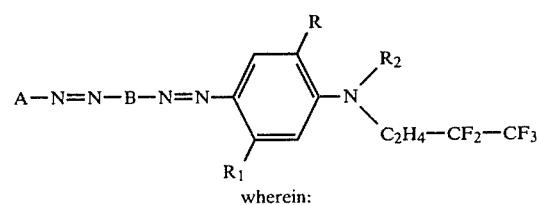

wherein:

A is 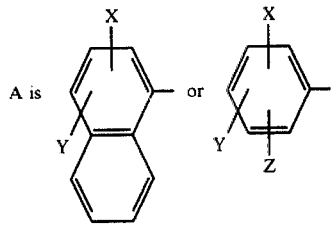

X represents a —SO₃H or PO₃H₂

Y represents hydrogen, chlorine, alkyl, alkoxy or nitro;

Z represents hydrogen;

B represents p-phenylene or 1,4-naphthylene unsubstituted or substituted by one or two alkyl or alkoxy groups;

R represents hydrogen, alkyl or alkoxy;

$R_1$ represents hydrogen, chlorine, alkyl, alkoxy or acetylamino; and $R_2$ represents hydrogen, alkyl, cyanethyl or hydroxyalkyl, the alkyl and alkoxy having 1 to 5 carbon atoms.

2. The sodium salt of [4-(N-ethyl-N-3′,3′,4′,4′,4′-pentafluorobutyl)amino-2-methyl-benzene]-<1 azo 4′>-[benzene-azo-benzene-3-sulphonic] acid.

3. The sodium salt of [4-(N-cyanethyl-N-3′,3′,4′,4′,4′-pentafluorobutyl)amino-2-methyl-benzene]-<1 azo 4′>-[benzene-azo-benzene-3-sulphonic] acid.

4. The sodium salt of [4-N-ethyl-N-3′,3′,4′,4′,4′-pentafluorobutyl)amino-2-methyl-benzene]-<1 azo 4′>-[naphthalene-azo-benzene-3-sulphonic] acid.

* * * * *